United States Patent
Kim et al.

(10) Patent No.: US 8,538,150 B2
(45) Date of Patent: Sep. 17, 2013

(54) METHOD AND APPARATUS FOR SEGMENTING MULTI-VIEW IMAGES INTO FOREGROUND AND BACKGROUND BASED ON CODEBOOK

(75) Inventors: Kap Kee Kim, Daejeon (KR); Bon Woo Hwang, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 638 days.

(21) Appl. No.: 12/788,809

(22) Filed: May 27, 2010

(65) Prior Publication Data
US 2011/0142343 A1     Jun. 16, 2011

(30) Foreign Application Priority Data
Dec. 11, 2009    (KR) .................. 10-2009-0123341

(51) Int. Cl.
*G06K 9/34* (2006.01)
*G06K 9/00* (2006.01)

(52) U.S. Cl.
USPC .......................................... 382/173; 382/103

(58) Field of Classification Search
None
See application file for complete search history.

(56) References Cited

U.S. PATENT DOCUMENTS

| | | | |
|---|---|---|---|
| 6,898,313 B2* | 5/2005 | Li et al. .................... | 382/176 |
| 6,903,735 B2* | 6/2005 | Jeong et al. ............... | 345/418 |
| 6,983,074 B1* | 1/2006 | Clauson et al. ........... | 382/244 |
| 6,999,620 B1* | 2/2006 | Harville ..................... | 382/173 |
| 7,606,417 B2 | 10/2009 | Steinberg et al. | |
| 2003/0058111 A1* | 3/2003 | Lee et al. ................... | 340/573.1 |
| 2004/0175058 A1* | 9/2004 | Jojic et al. ................. | 382/305 |
| 2004/0222987 A1* | 11/2004 | Chang et al. .............. | 345/419 |
| 2006/0170769 A1* | 8/2006 | Zhou .......................... | 348/143 |
| 2007/0296721 A1* | 12/2007 | Chang et al. .............. | 345/427 |
| 2008/0002856 A1* | 1/2008 | Ma et al. .................... | 382/103 |
| 2008/0304743 A1* | 12/2008 | Tang et al. ................. | 382/173 |
| 2009/0060352 A1* | 3/2009 | Distante et al. ........... | 382/224 |
| 2010/0033484 A1* | 2/2010 | Kim et al. .................. | 345/426 |
| 2010/0111370 A1* | 5/2010 | Black et al. ............... | 382/111 |
| 2010/0158372 A1* | 6/2010 | Kim et al. .................. | 382/171 |
| 2011/0013836 A1* | 1/2011 | Gefen et al. ............... | 382/171 |
| 2011/0050878 A1* | 3/2011 | Wells et al. ................ | 348/86 |

FOREIGN PATENT DOCUMENTS

| | | |
|---|---|---|
| KR | 10-2007-0009899 A | 1/2007 |
| KR | 10-2008-0052363 A | 6/2008 |
| KR | 10-2008-0062520 | 7/2008 |
| KR | 10-2009-0062440 | 6/2009 |
| KR | 10-2010-0073081 | 7/2010 |
| WO | 2006/035358 A1 | 4/2006 |

OTHER PUBLICATIONS

"Real Time Foreground-Background Segmentation Using a Modified Codebook Model," Atif Ilyas et al, Advanced Video and Signal Based Surveillance, 2009. AVSS '09. Sixth IEEE International Conference on Date of Conference: Sep. 2-4, 2009, pp. 454-459.*

(Continued)

*Primary Examiner* — Wenpeng Chen
(74) *Attorney, Agent, or Firm* — Kile Park Reed & Houtteman PLLC

(57) ABSTRACT

Embodiments of the present invention provide methods and apparatuses for segmenting multi-view images into foreground and background based on a codebook. For example, in some embodiments, an apparatus is provided that includes: (a) a background model generation unit for extracting a codebook from multi-view background images and generating codeword mapping tables operating in conjunction with the codebook; and (b) a foreground and background segmentation unit for segmenting multi-view images into foreground and background using the codebook and the codeword mapping tables.

20 Claims, 5 Drawing Sheets

(56) References Cited

OTHER PUBLICATIONS

"Multi-Camera Topology Recovery From Coherent Motion," Zehavit Mandel et al., First ACM/IEEE International Conference on Distributed Smart Cameras, 2007. ICDSC '07, Year: 2007, pp. 243-250.*

"Box-based Codebook Model for Real-time Objects Detection," Qiu Tu et al, Proceedings of the 7$^{th}$ World Congress on Intelligent Control and Automation Jun. 25-27, 2008, Chongqing, China, pp. 7621-7625.*

"Real-time foreground-background segmentation using codebook model", Kyungnam Kim et al., Real-Time Imaging, vol. 11 (2005), pp. 172-185.

Kyungnam Kim et al, "Real-time foreground-background segmentation using codebook model", Real-Time Imaging, vol. 11 Issue 3, pp. 172-185, Jun. 2005.

* cited by examiner

METHOD AND APPARATUS FOR SEGMENTING MULTI-VIEW IMAGES INTO FOREGROUND AND BACKGROUND BASED ON CODEBOOK

CROSS-REFERENCE(S) TO RELATED APPLICATION(S)

The present invention claims priority of Korean Patent Application No. 10-2009-0123341, filed on Dec. 11, 2009, which is incorporated herein by reference.

FIELD OF THE INVENTION

The present invention relates to a technology for segmenting images into foreground and background, and, more particularly, to a method and apparatus for segmenting multi-view images into foreground and background based on a codebook, which is capable of, when segmenting multi-view images into the foreground and the background, reducing the amount of memory used while minimizing a decline in performance.

BACKGROUND OF THE INVENTION

In a conventional method of segmenting multi-view images into foreground and background, multi-view images are segmented into the foreground and the background by modeling the background based on brightness values of pixels.

However, since a complicated background is not easy to model based on brightness values, it is modeled using a Mixture of Gaussian (hereinafter referred to as 'MOG') method. The MOG method is disadvantageous in that rapid variation in the background is difficult to be modeled using a small number of Gaussians. If the number of Gaussians is increased and the learning ratio is set for rapid variation in order to solve this problem, a problem arises in that a slowly varying background is detected as the foreground.

Meanwhile, as an actually applied technology, there is a codebook method which focuses on the speed. In this codebook method, a background model is generated depending on whether predetermined conditions are fulfilled. The codebook method is disadvantageous in that it does not generate an accurate model. Although the codebook method is advantageous in terms of the speed, it is also disadvantageous in terms of time because redundant background models (i.e., codewords in a codebook) can be generated and, therefore, many codewords need to be searched for.

Furthermore, the amount of memory used is not taken into consideration in the codebook method. That is, when pixel-based background models are generated, the amount of memory used is increased in proportion to the size of an image. The above-described algorithms are chiefly applied only to a single-view image. If an algorithm intended for a single-view image is applied to multi-view images, the amount of memory used is increased in multiples of the number of views. If the quality of such multi-view images is equal to or higher than High-Definition (HD), the amount of memory used is enormously increased, so that setting a limit on the amount of memory used is required. From the viewpoint of system configuration for actual applications, the amount of memory is inevitably limited because of hardware and the operating system.

For example, in ordinary 32-bit Windows-series operating programs, the amount of memory used is limited to a maximum of 2 GB. If an application program using foreground/background segmentation software is used, the use of memory allocated to the foreground/background segmentation software is limited. If the application program uses 1 GB, the foreground/background segmentation software can use a maximum of 1 GB. Assuming that twenty HD cameras are used for multiple views, it can be expected that about 50 MB of memory is available for one view.

As described above, if the conventional method of segmenting a single-view image into the foreground and the background is applied to multi-view images, the amount of memory used is limited. If an application program using the foreground/background segmentation software uses a maximum of 1 GB or the number of HD cameras exceeds 20, the amount of memory used is inevitably further reduced.

SUMMARY OF THE INVENTION

In view of the above, the present invention provides a method and apparatus for segmenting multi-view images into foreground and background based on a codebook, which is capable of minimizing a decline in performance while reducing the amount of memory used when the multi-view images are segmented into the foreground and the background.

Further, the present invention provides a method and apparatus for segmenting multi-view images into foreground and background based on a codebook, in which since the amount of memory used is limited in the case where a foreground/background segmentation program is run in multi-view images using a limited hardware and hardware operating program, multi-view images can be segmented into foreground and background by generating a codebook in all of the multi-view images and generating pixel-based codeword mapping tables for respective views.

In accordance with a first aspect of the present invention, there is provided an apparatus for segmenting multi-view images into foreground and background based on a codebook, the apparatus including:

a background model generation unit for extracting a codebook from multi-view background images and generating codeword mapping tables operating in conjunction with the codebook; and a foreground and background segmentation unit for segmenting multi-view images into foreground and background using the codebook and the codeword mapping tables.

In accordance with a second aspect of the present invention, there is provided a method for segmenting multi-view images into foreground and background based on a codebook, the method including:

generating a background model by extracting a codebook from multi-view background images and generating codeword mapping tables operating in conjunction with the codebook; and segmenting multi-view images into foreground and background using the codebook and the codeword mapping tables.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described with reference to the accompanying drawings which form a part hereof.

Figure 1:
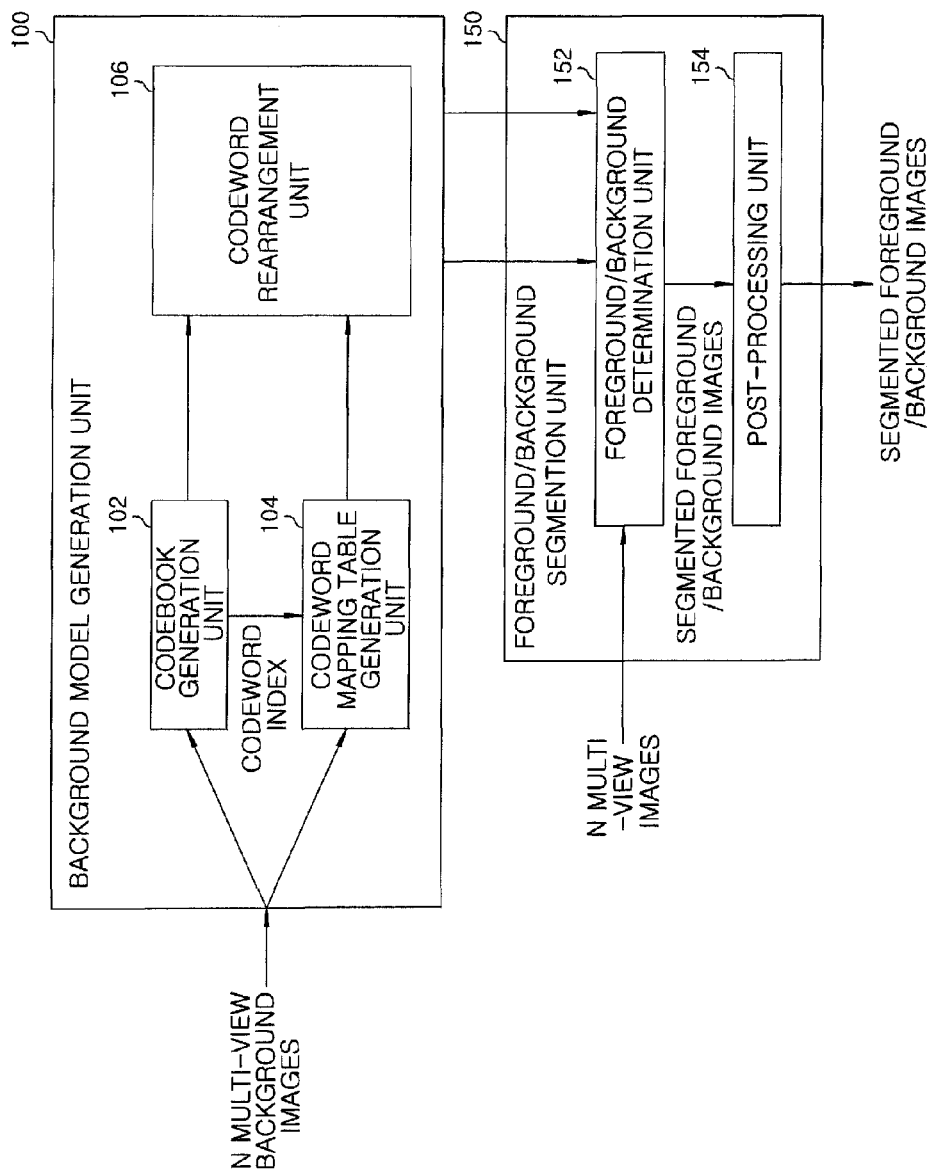
FIG. 1 is a block diagram showing the construction of an apparatus for segmenting multi-view images into the foreground and the background in accordance with an embodiment of the present invention.

FIG. 1 is a block diagram showing a construction of an apparatus for segmenting multi-view images into the foreground and the background in accordance with an embodiment of the present invention.

Referring to FIG. 1, the apparatus for segmenting images into the foreground and the background includes a background model generation unit 100 and a foreground/background segmentation unit 150. The background model generation unit 100 generates a shared codebook using input multi-view background images and generates codeword mapping tables operating in conjunction with the generated codebook. The foreground/background segmentation unit 150 segments input multi-view images into the foreground and the background using the shared codebook and the generated codeword mapping tables.

Here, the background model generation unit 100 includes a codebook generation unit 102, a codeword mapping table generation unit 104, and a codeword rearrangement unit 106. The foreground/background segmentation unit 150 includes a foreground/background determination unit 152 and a post-processing unit 154.

The codebook generation unit 102 in the background model generation unit 100 generates the codebook by extracting codebook information from the pixel information of the input multi-view background images (e.g., N multi-view background images) in order to generate the background model. The codeword mapping table generation unit 104 generates, for respective views, the codeword mapping tables to which the codeword indexes of a corresponding codebook are mapped, on the basis of the multi-view image information received from the codebook generation unit 102.

Here, when N cameras are used, N codeword mapping tables are generated since the codeword mapping tables are generated for respective views (i.e., for respective cameras), while a single codebook is generated for all of multi-view background images.

Meanwhile, the codebook is generated in such a way that the codebook generation unit 102 measures a distance between the pixel information of the input multi-view background images and an existing codeword and determines, on the basis of the measured distance, whether the pixel information is the existing codeword within the codebook or a new codeword. When the measured distance is greater than a critical value preset for the existing codeword (for example, the critical value is defined as "epsilon"), the pixel information is determined to be the new codeword and the new codeword is added to the codebook. When the measured distance is less than the predetermined critical value, the pixel information is determined to be the existing codeword.

The codeword mapping tables are created in such a way that since the codeword mapping table generation unit 104 already knows a view (e.g., a corresponding camera) and a position (e.g., corresponding coordinates in an image) of each pixel in the input multi-view background images, the codeword mapping table generation unit 104 stores codeword indexes, designated by the codeword generation unit 102, in the respective positions of the codeword mapping tables. Here, the redundancy of the same content is not allowed in the codeword mapping table, and a unique codeword number is stored at each of the positions of the codeword mapping tables.

The codeword rearrangement unit 106 arranges codewords on the basis of the frequency of occurrence. The codeword rearrangement unit 106 processes all of the input multi-view background images and rearranges corresponding indexes for respective pixels in the codeword mapping tables in order of occurrence frequency in the codebook.

The foreground/background determination unit 152 in the foreground/background segmentation unit 150 measures distances between the pixel information of the input multi-view images and corresponding codeword information based on the codebook and the codeword mapping tables generated by the background model generation unit 100, and determines the foreground and the background of the input multi-view images on the basis of the measured distances.

The distances are sequentially measured for the codewords positioned at corresponding pixels on the basis of the critical value defined as epsilon. If the distance is smaller than the critical value, the corresponding pixel information is determined as the background. On the contrary, if the distance is equal to or greater than the critical value, i.e., if there is no codeword having a distance less than the critical value at a corresponding pixel, the corresponding pixel information is determined as the foreground.

The images segmented into the foreground and the background by the foreground/background determination unit 152 are sent to the post-processing unit 154.

The post-processing unit 154 performs post-processing on the images, segmented into the foreground and the background, on the basis of morphology, and then outputs images accurately segmented into the foreground and the background. In the post-processing, the morphology operation is used, and boundary lines can be established by processing broken edges, overlapping regions or noise regions.

In the morphology operation, an erosion operation of performing binary processing on all of the images and then reducing the size of the foreground relative to the background in the binary images and an expansion operation of uniformly expanding the foreground relative to the background are performed. Thereafter, the boundary line of each region is more precisely established using a difference between two images output from the erosion and expansion operations.

Figure 2:
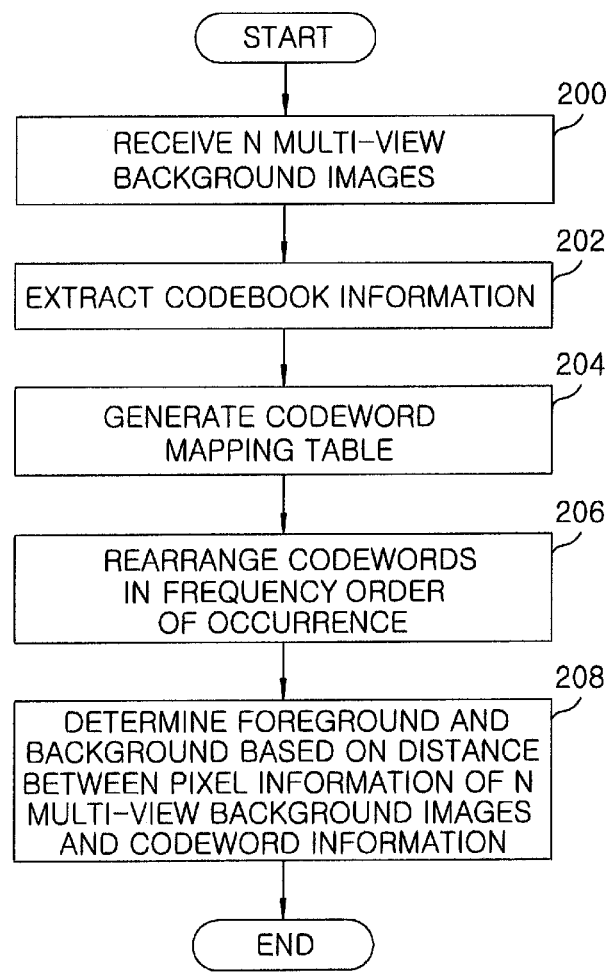
FIG. 2 is a flowchart illustrating the operating procedure of the apparatus for segmenting multi-view images into the foreground and the background in accordance with an embodiment of the present invention.

FIG. 2 is a flowchart illustrating the operating procedure of the apparatus for segmenting multi-view images into the foreground and the background in accordance with the embodiment of the present invention.

Referring to FIG. 2, at step 200, N multi-view background images are input to the background model generation unit 100 and then transferred to the codebook generation unit 102 and the codeword mapping table generation unit 104. At step 202, the codebook generation unit 102 generates a codebook by extracting codebook information from the pixel information of the multi-view background images.

At step 204, the codeword mapping table generation unit 104 generates pixel-based codeword mapping tables for respective views. At step 206, the codeword rearrangement unit 106 receives the generated codebook and codeword mapping tables and sequentially rearranges corresponding indexes for respective pixels of the codeword mapping tables in order of occurrence frequency in the codebook.

The codebook and the N rearranged codeword mapping tables are input to the foreground/background segmentation unit 150. At step 208, the foreground/background determination unit 152 measures the distances between the pixel information of N multi-view images and corresponding codeword information, determines the foreground and the background on the basis of the measured distances, performs post-processing on the images segmented into the foreground and the background on the basis of morphology, and then outputs images accurately segmented into the foreground and background.

Figure 3:
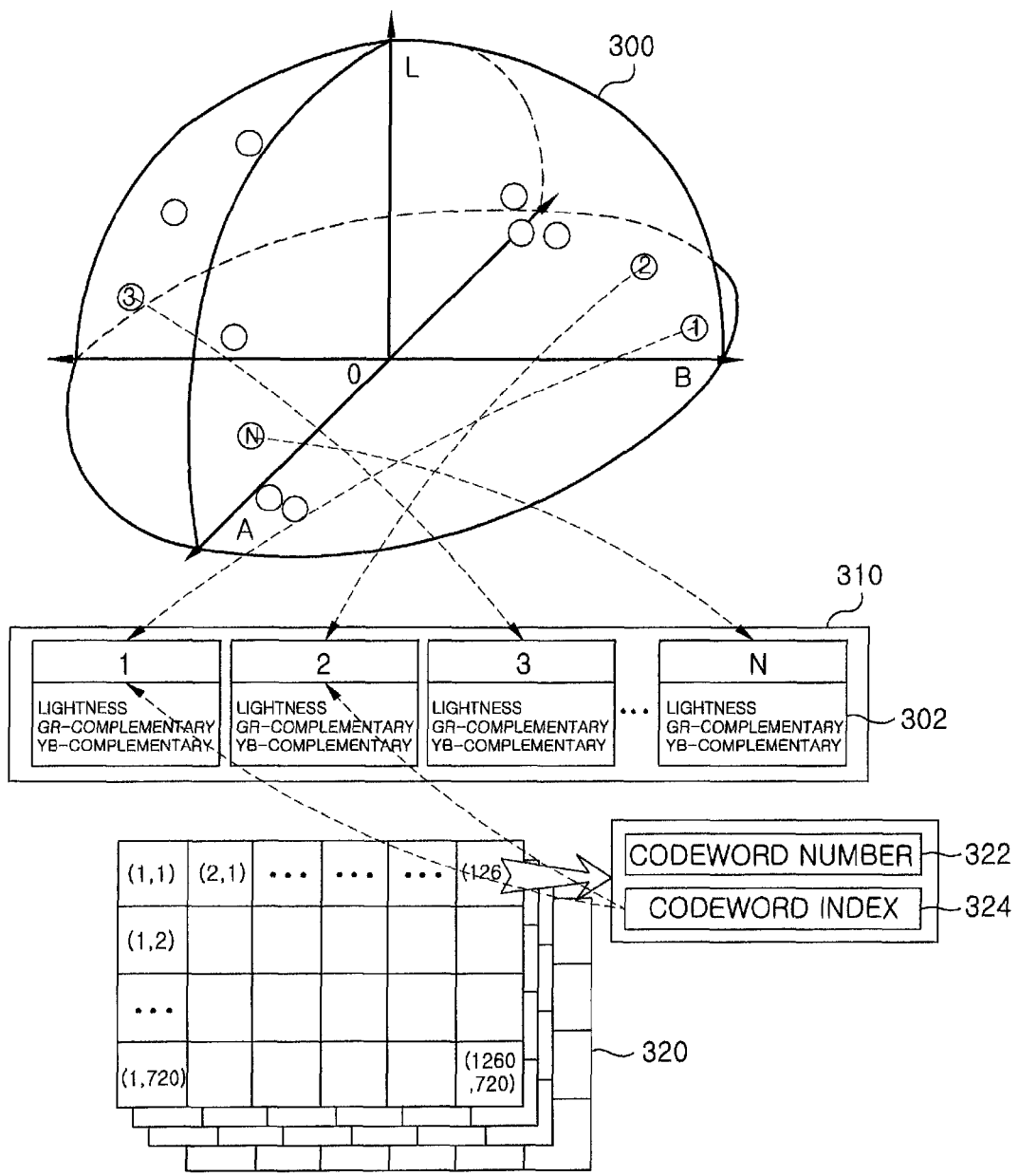
FIG. 3 is a diagram showing a method of generating a codebook and codeword mapping tables in accordance with an embodiment of the present invention.

FIG. 3 is a view showing a method of generating a codebook and codeword mapping tables in accordance with the embodiment of the present invention.

The background model generation unit 100 is operated on the basis of a LAB (L: lightness, A: green-red complementary, B: yellow-blue complementary) color model. Colors are used as codebook information (i.e., 3-D position information in a LAB color space) and the codebook information is represented as a set of spheres in the space 300. Here, the spheres whose radiuses are a predetermined critical value defined as epsilon correspond to the codewords 302. Each of the codeword 302 is obtained by modeling the background color information in all of the multi-view images.

The codewords 302 are stored in the background model generation unit 100 in a form of the codebook 310 shown in FIG. 3. The background model generation unit 100 generates codeword mapping tables 320 by mapping codewords 302 which may appear at pixel positions for respective views. The codeword mapping tables 320 include a codeword number 322 and a codeword index 324 at each position. The foreground/background segmentation unit 150 performs segmentation into the foreground and the background by referring to the codebook 310 and the codeword mapping tables 320 stored in the background model generation unit 100 as described above.

Meanwhile, the results of the application of the foreground and background segmentation apparatus of the present invention will be described below. Various advantages are calculated in a form of detailed numeral values.

First, the performance of segmentation into the foreground and the background was measured based on an error rate. The error rate is expressed using the following Equation 1:

$$\text{ERROR} = \frac{\text{false positive \# + false negative \#}}{\text{object \#}} \qquad \text{[Equation 1]}$$

where false positive # is the number of pixels corresponding to the background but having been erroneously determined as the foreground, false negative # is the number of pixels corresponding to the foreground but having been erroneously determined as the background, and object # is the number of pixels which constitute the foreground.

That is, the error rate is obtained by dividing the sum of the number of pixels, corresponding to the background but having been erroneously determined as the foreground, and the number of pixels, corresponding to the foreground but having been erroneously determined as the background, by the number of pixels constituting the foreground.

Figure 4:
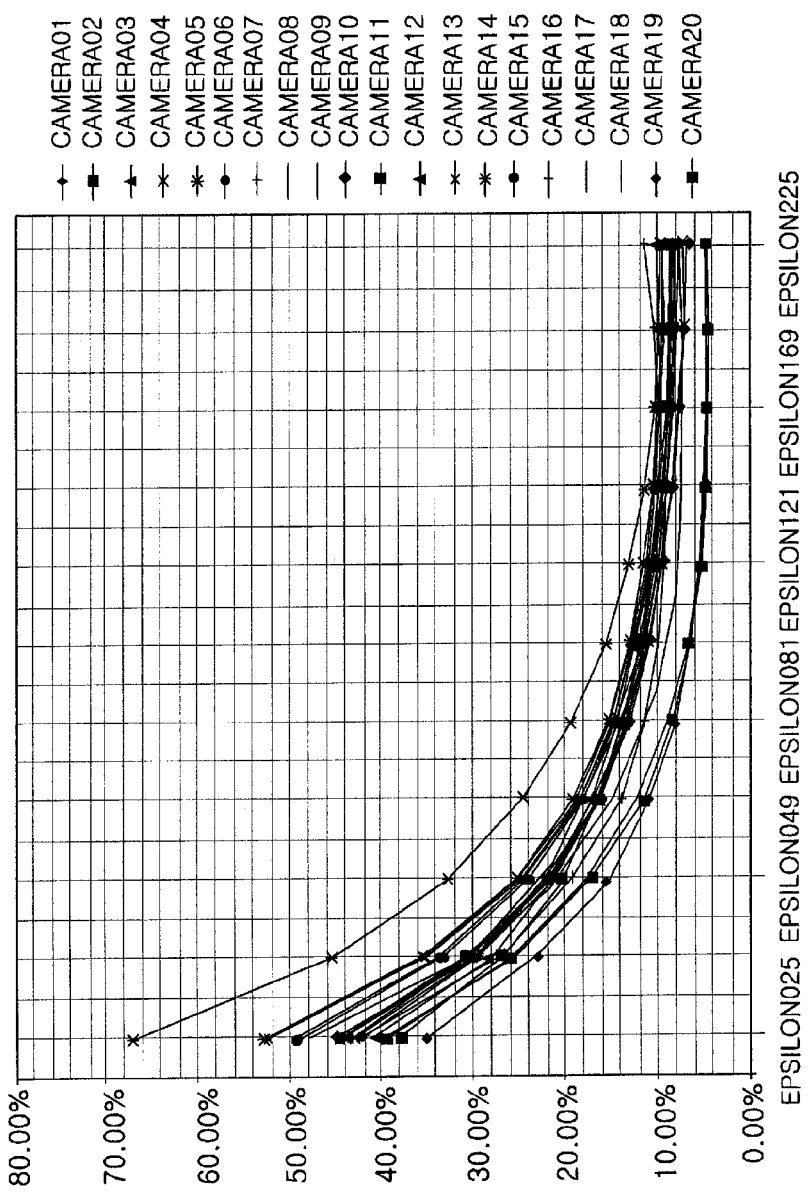
FIG. 4 illustrates a graph showing an accuracy of segmentation when a foreground/background segmentation method, intended for a single-view image, based on a codebook of a LAB color model is applied to multi-view images.

FIG. 4 illustrates a graph showing an accuracy of segmentation when a foreground/background segmentation method, intended for a single-view image, based on a codebook of a LAB color model is applied to multi-view images.

From FIG. 4, it can be seen that cameras exhibit the error rates for segmenting multi-view images into the foreground and the background in the range from a minimum of 4.9% to a maximum of 11.47% for an epsilon 225 which produces a critical value having the highest performance. From this graph, it can also be seen that there is no decline in the performance of segmenting multi-view images into the foreground and the background.

Figure 5:
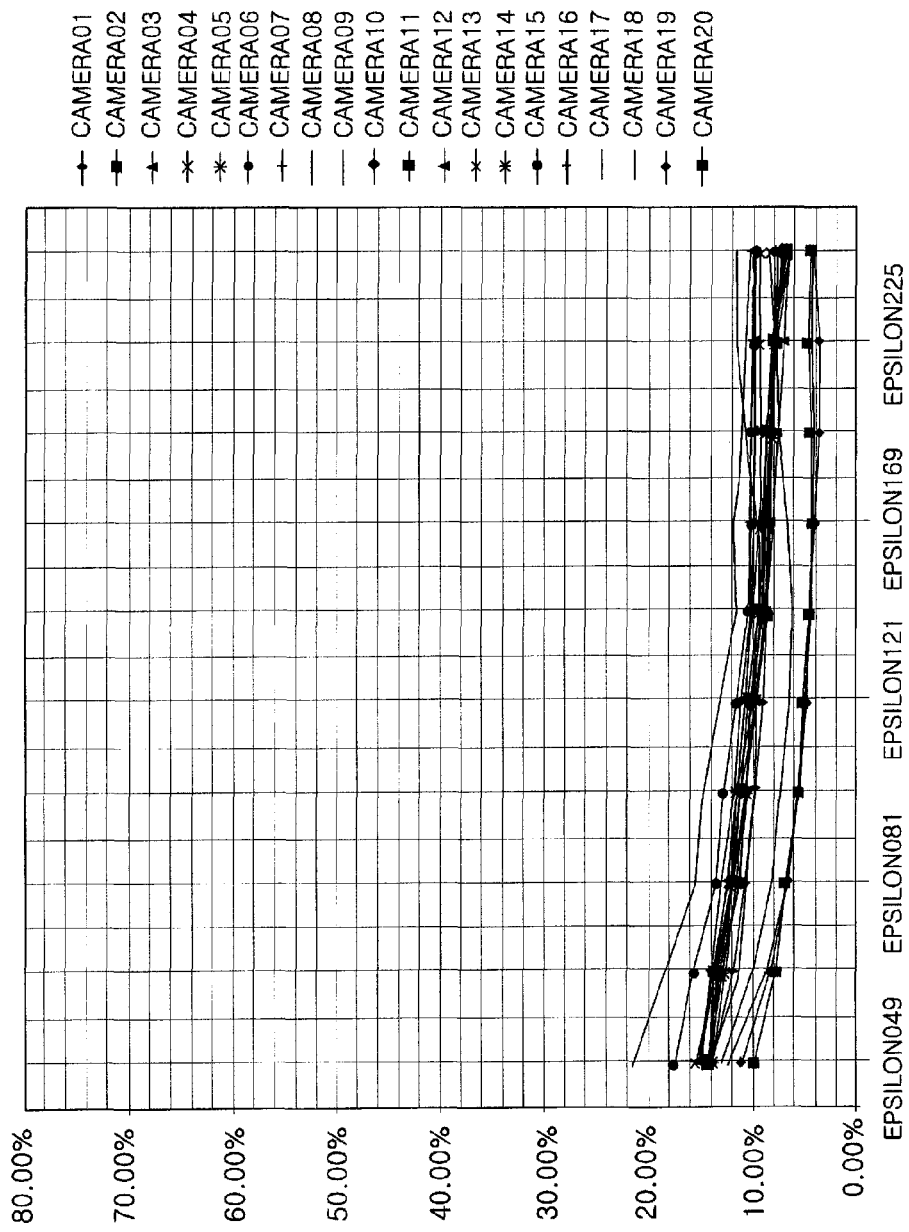
FIG. 5 illustrates a graph showing an accuracy of segmentation in a foreground/background segmentation method for multi-view images based on a codebook of a LAB color model in accordance with the embodiment of the present invention.

FIG. 5 illustrates a graph showing an accuracy of segmentation in a foreground/background segmentation method for multi-view images based on a codebook of a LAB color model in accordance with the embodiment of the present invention.

Referring to FIG. 5, for the same epsilon 225, the error rate for segmentation into the foreground and the background ranges from a minimum of 4.24% to a maximum of 11.74%. As a result, it can be seen that there is almost no difference in performance between the method shown in FIG. 4 and the method shown in FIG. 5 in accordance with the embodiment of the present invention, and the method of this embodiment shown in FIG. 5 may sometimes have a better performance than the method shown in FIG. 4.

Meanwhile, as a result of running tests in an actual foreground/background segmentation program, when the number of HD cameras is 20, the amount of memory used for the method of this embodiment shown in FIG. 5 was about 270 MB, whereas the amount of memory used for the method shown in FIG. 4 was 700 MB. Therefore, the amount of memory used for the method of this embodiment is significantly smaller than that used for the method shown in FIG. 4. Furthermore, the processing speed per unit time for the method of this embodiment is 66 fps to 100 fps which is almost the same as that for the method shown in FIG. 4. Accordingly, the method of this embodiment is advantageous in that the amount of memory used can be reduced without reducing its performance.

As described above, since the amount of memory used is limited when a foreground and background segmentation program is run in the multi-view images using a limited hardware and hardware operating program, the method and apparatus for segmenting multi-view images into foreground and background based on a codebook in accordance with the embodiments of the present invention is configured such that the foreground and the background are segmented by generating a codebook in all the multi-view images and then generating pixel-based codeword mapping tables in respective views.

Accordingly, the method and apparatus for segmenting multi-view images into the foreground and the background in accordance with the embodiments of the present invention have the advantages of reducing the amount of memory used while minimizing decline in the performance of segmenting multi-view images into the foreground and the background.

While the invention has been shown and described with respect to the embodiments, it will be understood by those skilled in the art that various changes and modification may be made without departing from the scope of the invention as defined in the following claims.

What is claimed is:

1. An apparatus comprising:
 a background model generation unit for extracting a codebook from multi-view background images and generating codeword mapping tables operating in conjunction with the codebook; and
 a foreground and background segmentation unit for segmenting multi-view images into foreground and background using the codebook and the codeword mapping tables.

2. The apparatus of claim 1, wherein the background model generation unit includes:
 a codebook generation unit for extracting codeword indexes from pixel information of the multi-view background images to generate codebook information; and
 a codeword mapping table generation unit for generating the codeword mapping tables to which the codeword indexes are mapped.

3. The apparatus of claim 2, wherein the codebook generation unit measures a distance between pixel information and an existing codeword, determines the pixel information as a new codeword if the distance is equal to or greater than a predetermined critical value, and determines the pixel information as the existing codeword if the distance is less than the predetermined critical value.

4. The apparatus of claim 2, wherein the codeword mapping table generation unit generates the codeword mapping tables for respective views.

5. The apparatus of claim 1, wherein the background model generation unit further includes a codeword rearrangement unit for rearranging corresponding indexes for respective pixels of the codeword mapping tables in descending order of frequency of occurrence in the codebook.

6. The apparatus of claim 1, wherein the foreground and background segmentation unit includes:
 a foreground/background determination unit for measuring, when the multi-view images are received, distances between pixel information of respective pixels in the multi-view images and corresponding codeword information based on the codebook and the codeword mapping tables to determine whether the respective pixels correspond to the foreground or the background; and
 a post-processing unit for performing post-processing on the pixels, determined as the foreground or the background, using a morphology operation, to segment the multi-view images into the foreground and the background.

7. The apparatus of claim 6, wherein the foreground/background determination unit sequentially measures the distances from the respective pixels to codewords positioned at the respective pixels, to determine, if the distance is less than a critical value, a corresponding pixel as the background, and determine, if the distance is equal to or greater than the critical value, a corresponding pixel as the foreground.

8. The apparatus of claim 6, wherein the morphology operation is executed by:
 performing an erosion operation which performs binary process on a whole input image to generate a binary image and then reduces a size of the foreground relative to the background in the binary image;
 performing an expansion operation which uniformly expands the foreground relative to the background; and
 processing a boundary line of each region using a difference between two images output from the erosion and expansion operations.

9. The apparatus of claim 1, wherein the background model generation unit, when it is based on a color model of a specific image, is set with codewords modeling background color information of the multi-view images, the codebook representing 3-D position information in color space, and the codeword mapping tables which are composed of a codeword number and a codeword index at each position.

10. The apparatus of claim 1, wherein performance of the segmentation into the foreground and the background is determined based on an error rate obtained by dividing a sum of the number of pixels, corresponding to the background but having been erroneously determined as the foreground, and the number of pixels, corresponding to the foreground but having been erroneously determined as the background, by the number of pixels constituting the foreground.

11. A method comprising:
 generating a background model by extracting a codebook from multi-view background images and generating codeword mapping tables operating in conjunction with the codebook; and
 segmenting multi-view images into foreground and background using the codebook and the codeword mapping tables.

12. The method of claim 11, wherein said generating a background model includes:
 extracting codeword indexes from pixel information of the multi-view background images to generate codebook information; and
 generating the codeword mapping tables to which the codeword indexes are mapped.

13. The method of claim 12, wherein said segmenting multi-view images includes:
 measuring a distance between pixel information and an existing codeword in the codebook;
 determining the pixel information, when the distance is equal to or greater than a predetermined critical value, as a new codeword to add the new codeword to the codebook; and
 determining the pixel information, when the distance is less than the predetermined critical value, as the existing codeword.

14. The method of claim 12, wherein the codeword mapping tables are generated for respective views.

15. The method of claim 11, wherein said generating a background model includes rearranging codeword indexes for respective pixels in the codeword mapping tables in order of occurrence frequency of the codeword indexes in the codebook.

16. The method of claim 11, wherein said segmenting multi-view images into foreground and background includes:
 receiving the multi-view images;
 measuring distances between pixel information of respective pixels in the multi-view images and corresponding codeword information based on the codebook and the codeword mapping tables to determine whether the respective pixels correspond to the foreground or the background; and
 performing post-processing on the pixels, determined as the foreground or the background, using a morphology operation, to segment the multi-view images into the foreground and the background.

17. The method of claim 16, wherein said determining whether the respective pixels correspond to the foreground or the background includes:
 sequentially measuring the distances from the respective pixels to codewords positioned at the respective pixels;
 determining, if the distance is less than a critical value, a corresponding pixel as the background; and determining, if the distance is equal to or greater than the critical value, a corresponding pixel as the foreground.

18. The method of claim 16, wherein the morphology operation is executed by:
performing an erosion operation which performs binary process on a whole input image to generate a binary image and then reduces a size of the foreground relative to the background in the binary image;
performing an expansion operation which uniformly expands the foreground relative to the background; and
processing a boundary line of each region using a difference between two images output from the erosion and expansion operations.

19. The method of claim 11, wherein the background model, when it is based on a color model of a specific image, is set with codewords modeling background color information of the multi-view images, the codebook representing 3-D position information in color space, and the codeword mapping tables which is composed of a codeword number and a codeword index at each position.

20. The method of claim 11, wherein performance of the segmentation into foreground and background is determined based on an error rate obtained by dividing a sum of the number of pixels, corresponding to the background but having been erroneously determined as the foreground, and the number of pixels, corresponding to the foreground but having been erroneously determined as the background, by the number of pixels constituting the foreground.

* * * * *